UNITED STATES PATENT OFFICE.

NICOLAUS MOSKOVITS AND KAI A. JACOBSEN, OF NAGY-VÁRAD, HUNGARY, ASSIGNORS TO THE FIRM OF MOSKOVITS MÓR ÉS FIA, OF NAGY-VÁRAD, HUNGARY.

SUBSTITUTE HIGHLY-NITROGENOUS FOOD AND PROCESS OF PRODUCING THE SAME.

1,277,336.     Specification of Letters Patent.     Patented Aug. 27, 1918.

No Drawing.     Application filed February 26, 1916. Serial No. 80,597.

*To all whom it may concern:*

Be it known that we, Dr. NICOLAUS MOSKOVITS and KAI A. JACOBSEN, subjects of the Kings of Hungary and Denmark, respectively, both residing in Nagy-Várad, Hungary, have invented certain new and useful Improvements in Substitute Highly-Nitrogenous Food and Processes of Producing the Same, of which the following is a specification.

Purified and concentrated blood serum has heretofore been employed for the production of different foods by working up a mixture of the same with flour, cocoanut butter, peanut butter and the like to make bread, zwieback, chocolate and other foods. Furthermore, by mixing the same with fruit juices and sugar and evaporating at a reduced temperature, albuminous fruit jellies have been produced.

The present invention is based upon the fact that blood serum is highly adapted for emulsifying fats and oils, which quality of the serum has not been employed up to the present time for the production of foods. The invention consists therein, that suitable fats or oils, or their mixtures, are emulsified in the blood serum. One preferably proceeds in such a way that the blood serum is purified in a well known manner, concentrated, and, if necessary, sterilized, and the fats, oils or their mixtures—preferably edible drying oils—emulsified in the product obtained. There can, in this manner, be produced an emulsion which completely replaces egg yolk, in that it shows the same results in baking and cooking as natural egg yolk, and also possesses an equal food value. There can also be added to the emulsion some lecithin.

The serum may be concentrated after the addition of the substitute materials.

An emulsion of blood serum with small amounts of oil or fat can also be employed as a substitute for gluten for kinds of flour which contain no, or only small quantities of gluten, for example, potato gluten.

Examples of the products and processes of making the same, are as follows:

1. *Egg yolk substitute.*

In 11 grams of blood serum concentrated to the consistency of syrup, 5 grams of sunflower seed oil are emulsified. To the emulsion can be added 1 gram of lecithin. There is attained in this manner a substance which is of equal value with the yolk of an egg and is adapted for the manufacture of farinaceous foods and pastry.

2. *Gluten substitute.*

Five grams of fat are emulsified in 500 grams of concentrated purified blood serum. If this emulsion is kneaded to a dough with one kilogram of potato flour and baked in the ordinary manner, there is obtained a batch which serves as a perfect substitute for bread.

In the claims the term "fats" is intended to cover fatty materials. The term "fats" is also intended to cover oils and mixtures of one or the other, or both.

What is claimed is:

1. A substitute highly nitrogenous food, consisting of an emulsion of fats, in purified blood serum.

2. A substitute highly nitrogenous food, consisting of an emulsion of fats, in purified concentrated blood serum.

3. A substitute highly nitrogenous food, consisting of an emulsion of an edible drying oil in purified blood serum.

4. A substitute highly nitrogenous food, consisting of an emulsion of an edible drying oil in purified concentrated blood serum.

5. A substitute highly nitrogenous food, consisting of an emulsion of fats, in purified blood serum with an addition of lecithin.

6. A substitute highly nitrogenous food, consisting of an emulsion of fats in purified concentrated blood serum with an addition of lecithin.

7. A substitute highly nitrogenous food, consisting of an emulsion of an edible drying oil in purified blood serum with an addition of lecithin.

8. A substitute highly nitrogenous food, consisting of an emulsion of an edible drying oil in purified concentrated blood serum with an addition of lecithin.

9. A process for the production of a substitute material of the character described, comprising emulsifying fats, in purified blood serum.

10. A process for the production of a substitute material of the character described, comprising emulsifying fats, in purified concentrated blood serum.

11. A process for the production of a substitute material of the character described, comprising emulsifying an edible drying oil in purified blood serum.

12. A process for the production of a substitute material of the character described, comprising emulsifying an edible drying oil in concentrated purified blood serum.

13. A process for the production of a substitute material of the character described, comprising emulsifying fats, in purified blood serum and adding lecithin.

14. A process for the production of a substitute material of the character described, comprising emulsifying fats, in purified concentrated blood serum and adding lecithin.

15. A process for the production of a substitute material of the character described, comprising emulsifying an edible drying oil in purified blood serum and adding lecithin.

16. A process for the production of a substitute material of the character described, comprising emulsifying an edible drying oil in purified concentrated blood serum, and adding lecithin.

In witness whereof, we have hereunto signed our names in the presence of a subscribing witness.

Dr. NICOLAUS MOSKOVITS.
 KAI A. JACOBSEN.

Witness:
 ARTHUR JACOBY.